Dec. 30, 1924.
L. B. KOCH
1,520,870
METHOD OF MANUFACTURING MILK BOTTLES AND LIKE CONSTRUCTIONS
Filed July 30, 1923      2 Sheets-Sheet 1
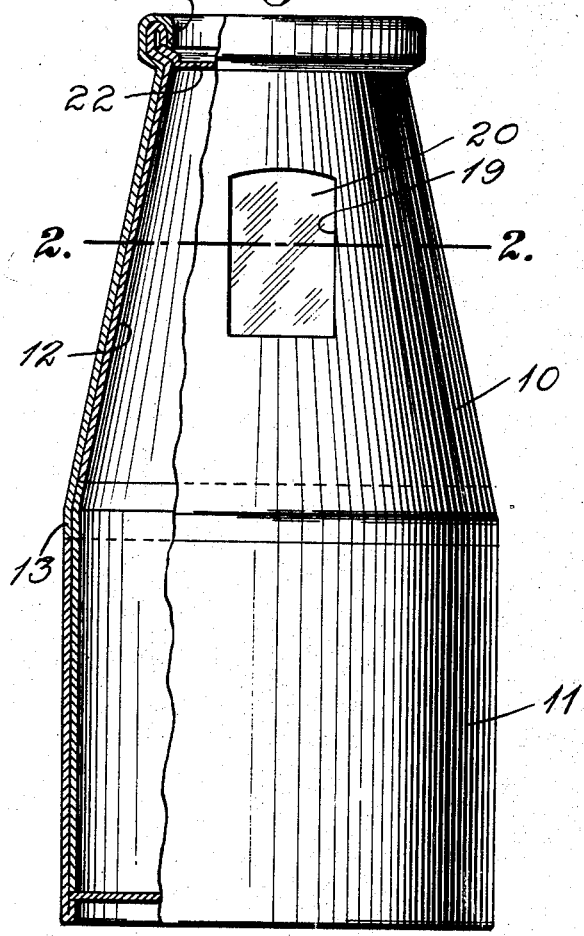
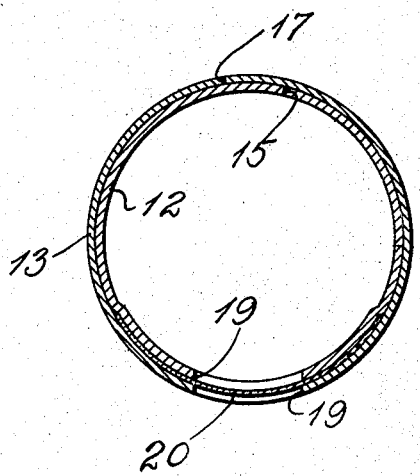
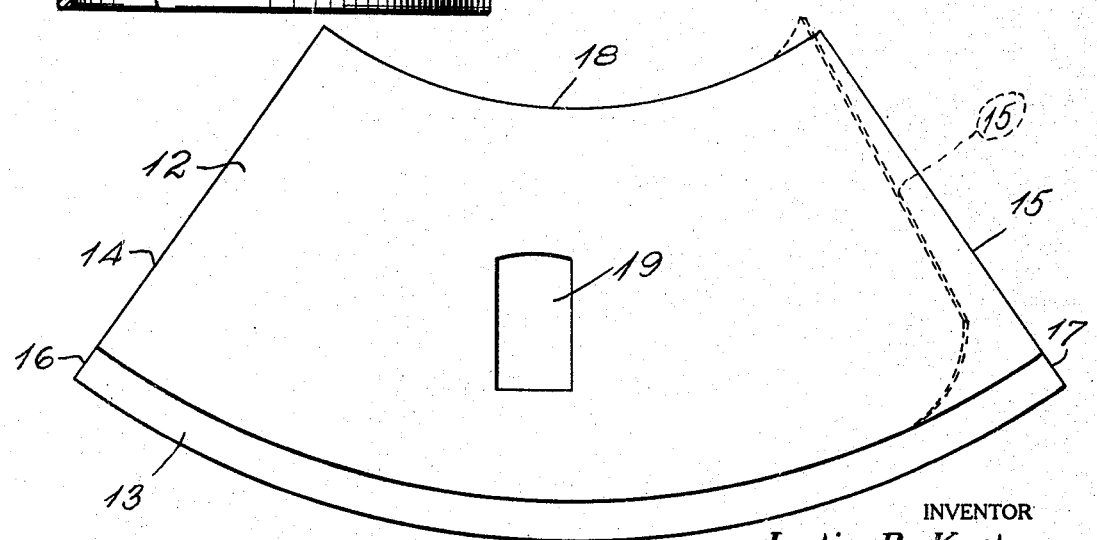
INVENTOR
Lydia B. Koch
BY
ATTORNEY Dec. 30, 1924.

L. B. KOCH 1,520,870

METHOD OF MANUFACTURING MILK BOTTLES AND LIKE CONSTRUCTIONS

Filed July 30, 1923     2 Sheets-Sheet 2

INVENTOR
*Lydia B. Koch*
BY
ATTORNEY

Patented Dec. 30, 1924.

1,520,870

UNITED STATES PATENT OFFICE.

LYDIA B. KOCH, OF NEW YORK, N. Y., ASSIGNOR TO REINFORCED PAPER BOTTLE CORPORATION, OF NEW YORK, N. Y., A CORPORATION OF DELAWARE.

METHOD OF MANUFACTURING MILK BOTTLES AND LIKE CONSTRUCTIONS.

Application filed July 30, 1923. Serial No. 654,764.

*To all whom it may concern:*

Be it known that I, LYDIA B. KOCH, a citizen of the United States, and a resident of New York city, in the county and State of New York, have invented certain new and useful Improvements in Methods of Manufacturing Milk Bottles and like Constructions, of which the following is a full, clear, and exact description.

Among the principal objects which the present invention has in view are: To secure accuracy in construction and assemblage of the parts forming the upper section of a paper constructed bottle, or similar article; to reduce the amount of machinery required for the manufacture of the said section; to reduce the cost of construction of said section; and to simplify and improve the method of constructing the said section when providing a sight-gauge therein.

Drawings.

Figure 1 is a side view of a bottle constructed and arranged in accordance with the present invention, a portion of the figure being cut away to show the construction of the same.

Figure 2 is a cross section taken on the line 2—2 in Fig. 1.

Figure 3 is a view showing the blanks from which the upper section of the bottle is constructed, the blanks being superposed to show the manner in which they are produced by suitable dies, the upturned end of the uppermost ply being shown in dotted lines.

Figure 4:
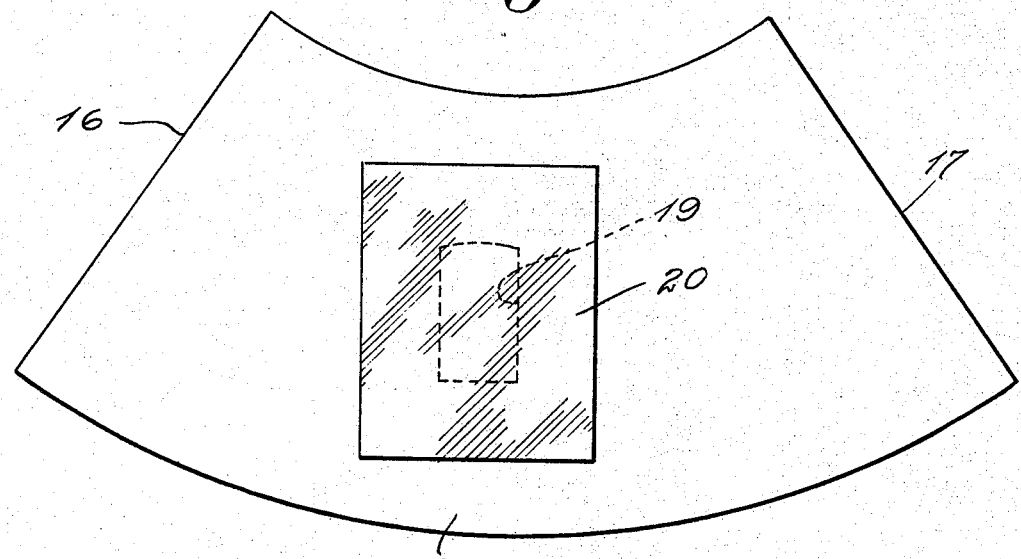
Figure 4 shows one of the blanks having superposed therein a clear view window patch.

Description.

The invention herein disclosed relates particularly to bottles or containers such as shown in Fig. 1 of the drawings which have frusto-conical top sections 10 and cylindrical bottom sections 11. Both sections are multiply in form and preferably two-ply. The inner ply of the bottom section is preferably slightly taller than the outer ply.

In this manner a seat is formed for the lower edges of the inner ply 12 and the outer ply 13 which are joined to form the walls of the top section 10. The plies 12 and 13 are formed simultaneously in the same die which cuts the edges 14 and 15 of the inner ply, and 16 and 17 for the outer ply. At the same time the curved upper edges of 18 of the two plies are severed from the sheets from which the plies 12 and 13 are formed. The opening 19 is punched at the same operation through both the plies by the same die.

It will be noted by reference to Fig. 3 of the drawings, that the opening 19 is offset from the center of the plies 12 and 13. The purpose of the offset is to provide a register which will secure the overhang of the two sections beyond the edges of the other section, as shown in Fig. 5 of the drawings.

When the blanks or plies 12 and 13 have been cut as shown in Fig. 3, the plies are separated, and to one or other thereof is adhered a transparent patch 20, preferably constructed of mica or thin transparent celluloid treated to prevent the same from contaminating the contents of the bottle.

Figure 5:
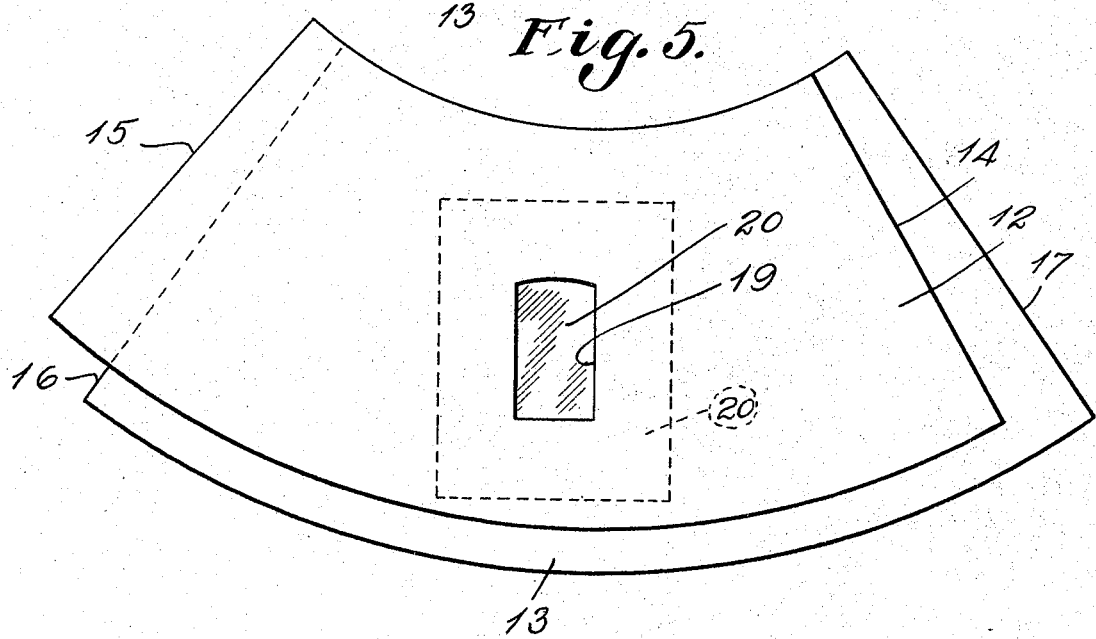
Figure 5 is a similar view showing the blanks united and in position to be molded and pressed to the shape shown in Fig. 1.

After the patch is thus disposed, the other ply, that shown in Fig. 5 of the drawing being the ply 12, is disposed upon and adhered to the said first mentioned ply and the patch mounted thereon, any suitable adhesive being employed to this end.

In placing the blank or ply 12, it will be noticed that it is reversed or turned over from the position shown in Fig. 3 so that the offset of the opening 19 in the two blanks or plies results in providing an extension of the said plies leaving the opening 19 now disposed in the center of the joined plies.

When the plies 12 and 13 are thus joined, and preferably prior to the setting of the adhesive that unites the same, they are spread on a form or mandrel to shape the top section as shown in Fig. 1 of the drawings. When folded around the form or mandrel, the overhangs between the edges 14 and 17 of the two plies and between the edges 15 and 16 thereof lap one upon the other, the edges 14 and 15, and the edges 16 and 17 closely abutting to form tight and relatively staggered joints. In this position the blanks or plies 12 and 13 are pressed in the shape shown in elevation and section in Fig. 1 of the drawings. The upper edges of the top portion 9 which form the overturned lip 21 shown in Fig. 1 of the drawings is a subsequent operation performed after the container is filled and after the top 22 shown in Fig. 1 of the drawings has been disposed in position.

When the top section 10 has been thus formed and the bottom section 11 has been formed as shown in the drawings, the two are brought together so that the upper edges of the two ply forming the bottom section, abut in registry with the bottom edges of the plies 12 and 13 of the top section.

Wherever the sections forming the container are thus brought together, a suitable adhesive is provided which when set maintains rigidly the structural relation of the parts. Subsequently, the container is given a suitable surface bath or is immersed in any fluid which will render the material of which the container is contained, impervious to the contents thereof as well as non-injurious thereto.

From the foregoing it is obvious that the cardinal points of novelty may be said to reside in the method of cutting the blanks or plies 12 and 13 when superposed, as shown in Fig. 3 of the drawings, with a registering device such as the opening 19 offset from the center of the said blanks, and subsequently reversing one of the said blanks when adhesively securing the blanks in position where the openings 19 each register, thus providing extensions of each of the blanks overhanging the other blanks.

Claims.

1. A method of manufacturing milk bottles and like constructions consisting in forming blanks simultaneously and of similar dimensions, said blanks having a registering opening therein offset from the center thereof; then reversing one of said blanks in superposed relation to the other of said blanks, the offset openings in said blanks being disposed in registered relation to form overhanging end extensions on each blank; and connecting said blanks together permanently.

2. A method of manufacturing milk bottles and like constructions consisting in forming blanks simultaneously and of similar dimensions, said blanks having a registering opening therein offset from the center thereof; then reversing one of said blanks in superposed relation to the other of said blanks, the offset openings in said blanks being disposed in registered relation to form overhanging end extensions on each blank; and connecting said blanks together permanently; and then bending the connected blanks to the shape desired for said bottle; and permanently connecting the overhanging extensions of said blanks.

3. A method of manufacturing milk bottles and like constructions consisting in forming a plurality of concentric segmental blanks in the same cutting operation, and simultaneously forming within the margins of said blanks a view opening, said opening being offset from the center of said blanks; then adhesively securing said blanks in superposed reversed relation with said openings in register to form in each blank, an end extension overhanging the edge of the blank to which it is connected.

4. A method of manufacturing milk bottles and like constructions consisting in forming a plurality of concentric segmental blanks in the same cutting operation, and simultaneously forming within the margins of said blanks a view opening, said opening being offset from the center of said blanks; then adhesively uniting said blanks in reversed relation, said view openings registering each with the other; and subsequently molding the connected blanks in shape where the overhanging extensions of said blanks lap to be adhesively connected.

5. A method of manufacturing milk bottles and like constructions consisting in simultaneously forming curved segmental blanks, said blanks being formed from paper sheets, said sheets being concentric and of different radial lengths, said lengths having within their margins a view opening formed simultaneously therein and offset from the center of the circumferential length thereof; then adhesively securing said blanks to each other in superposed reversed relation with the view openings in register, thereby forming at the ends of said adhered blanks, overhanging single ply extensions; and then molding said blanks to the desired shape where said extensions are lapped, one upon the other to be adhesively connected.

6. A method of manufacturing milk bottles and like constructions consisting in simultaneously forming curved segmental blanks, said blanks being formed from paper sheets, said sheets being concentric and of different radial lengths, said lengths having within their margins a view opening formed simultaneously therein and offset from the center of the circumferential length thereof; then adhesively securing said blanks to each other in superposed reversed relation with the view openings in register, thereby forming at the ends of said adhered blanks, overhanging single ply extensions; then inserting between said blanks in line with said registering openings, a transparent material; and then adhesively securing in permanent relation said blanks and transparent material.

LYDIA B. KOCH.